(12) United States Patent
Shi et al.

(10) Patent No.: US 12,219,479 B2
(45) Date of Patent: Feb. 4, 2025

(54) METHOD AND APPARATUS FOR GROUPING USER EQUIPMENTS

(71) Applicant: LENOVO (BEIJING) LIMITED, Beijing (CN)

(72) Inventors: Jie Shi, Beijing (CN); Lianhai Wu, Beijing (CN); Haiming Wang, Beijing (CN); Jing Han, Beijing (CN); Jie Hu, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 332 days.

(21) Appl. No.: 17/760,586

(22) PCT Filed: Sep. 30, 2019

(86) PCT No.: PCT/CN2019/109539
§ 371 (c)(1),
(2) Date: Mar. 15, 2022

(87) PCT Pub. No.: WO2021/062671
PCT Pub. Date: Apr. 8, 2021

(65) Prior Publication Data
US 2022/0377666 A1 Nov. 24, 2022

(51) Int. Cl.
*H04W 52/02* (2009.01)
*H04W 68/00* (2009.01)

(52) U.S. Cl.
CPC ... *H04W 52/0219* (2013.01); *H04W 52/0229* (2013.01); *H04W 68/005* (2013.01)

(58) Field of Classification Search
CPC ......... H04W 52/0219; H04W 52/0229; H04W 68/005

USPC ......................................................... 370/318
See application file for complete search history.

(56) References Cited

U.S. PATENT DOCUMENTS

| | | | |
|---|---|---|---|
| 2019/0349856 A1* | 11/2019 | Liu | H04W 52/0216 |
| 2020/0053645 A1* | 2/2020 | Charbit | H04W 76/28 |
| 2020/0107267 A1* | 4/2020 | Wu | H04W 76/28 |
| 2021/0329550 A1* | 10/2021 | Åström | H04W 68/02 |

FOREIGN PATENT DOCUMENTS

| | | | |
|---|---|---|---|
| CN | 109661021 A | 4/2019 | |
| WO | 2019095323 A1 | 5/2019 | |
| WO | WO-2020157261 A1 * | 8/2020 | ........ H04W 52/0232 |

OTHER PUBLICATIONS

3GPP TSG-RAN WG2 Meeting #104 R2-1817048 (Nov. 2018 (Year: 2018).*

(Continued)

*Primary Examiner* — William Nealon
(74) *Attorney, Agent, or Firm* — Kunzler Bean & Adamson (57) ABSTRACT

Embodiments of the present application are related to a method and apparatus for grouping user equipments (UEs). A method according to an embodiment of the present application includes: determining grouping rule information on a set of UE grouping rules for wake up signal (WUS) supported in a base station (BS); and configuring WUS resource information and group information associated with the set of grouping rules. Embodiments of the present application can improve the legacy WUS mechanism and efficiently reduce false wake up probability.

20 Claims, 7 Drawing Sheets

(56) References Cited

OTHER PUBLICATIONS

3GPP TSG-RAN WG1 Meeting #95 R1-18121198 (Nov. 2018) (Year: 2018).*
3GPP TSG-RAN WG1 Meeting #97 R1-1907570 (May 2019) (Year: 2019).*
3GPP reference (Year: 2019).*
International Searching Authority, "Written Opinion of the International Searching Authority," PCT/CN2019/109539, Jun. 23, 2020, pp. 1-4.
VIVO, On UE-group wake-up signal for eMTC, 3GPP TSG RAN WG1 #94, R1-1808215, Aug. 20-24, 2018, pp. 1-4, Gothenburg, Sweden.
Ericsson, UE-group wake-up signal in LTE-MTC, 3GPP TSG-RAN WG1 Meeting #95, R1-1812119, Nov. 12-16, 2018, pp. 1-11, Spokane, USA.
Qualcomm Incorporated, Summray of 6.2.1.1 UE group MWUS, 3GPP TSG-RAN WG1 #96, R1-1903252, Feb. 25-Mar. 1, 2019, pp. 1-8, Athens, Greece.
Intel Corporation, UE-group wake-up signal for NB-Iot, 3GPP TSG RAN WG1 Meeting #97, R1-1906772, May 13-17, 2019, pp. 1-8, Reno, USA.
Qualcomm Incorporated, Feature lead summary of 6.2.1.1 UE group MWUS, 3GPP TSG-RAN WG1 #97, R1-1907570, May 13-17, 2019, pp. 1-9, Reno, USA.

* cited by examiner

METHOD AND APPARATUS FOR GROUPING USER EQUIPMENTS

TECHNICAL FIELD

Embodiments of the present application generally relate to wireless communication technology, and more specifically relates to grouping user equipments (UEs) in narrow band internet of things (NB-IoT) technology.

BACKGROUND OF THE INVENTION

In the NB-IoT technology, a wake up signal (WUS) mechanism is introduced for power saving in long term evolution (LTE) release (R) 15, wherein a WUS indicates whether there is a paging process in a pre-defined paging occasion (PO).

Specifically, when the WUS mechanism is disabled, a UE always monitors paging messages on POs. When the WUS mechanism is enabled, the UE monitors the following possible paging messages in POs in response to the UE detecting a WUS, so that physical downlink control channel (PDCCH) blind detection can be performed. On the other hand, when the WUS mechanism is enabled, the UE will not monitor the following paging messages in POs in response to the UE not detecting any WUS.

However, due to complicated factors in a wireless communication network, the WUS mechanism may not work well under some conditions in the NB-IoT technology and still need further improvement.

BRIEF SUMMARY OF THE INVENTION

One objective of the embodiments of the present application is to provide a solution of grouping UEs in the NB-IoT technology.

One embodiment of the present application provides a method. The method may include: determining grouping rule information on a set of UE grouping rules for WUS supported in a base station (BS); and configuring WUS resource information and group information associated with the set of grouping rules.

According to another embodiment of the present application, the method may include: receiving paging probability group information, and information of paging probability zone; and determining a paging probability group of a UE.

According to yet another embodiment of the present application, the method may include: receiving grouping rule information on a set of UE grouping rules for WUS supported in a BS; receiving WUS resource information and group information associated with the set of grouping rules; determining a grouping rule of a UE for WUS based on capability information on grouping rules of the UE for WUS and the grouping rule information supported in the BS.

Yet another embodiment of the present application provides an apparatus. The apparatus include a non-transitory computer-readable medium having stored thereon computer-executable instructions; a receiving circuitry; a transmitting circuitry; and a processor coupled to the non-transitory computer-readable medium, the receiving circuitry and the transmitting circuitry, wherein the computer-executable instructions cause the processor to implement a method.

Embodiments of the present application can improve the legacy WUS mechanism and efficiently reduce false wake up probability.

BRIEF DESCRIPTION OF THE DRAWINGS

In order to describe the manner in which advantages and features of the present application can be obtained, a description of the present application is rendered by reference to specific embodiments thereof which are illustrated in the appended figures. These figures depict only example embodiments of the present application and are not therefore to be considered as limiting of its scope.

DETAILED DESCRIPTION OF THE INVENTION

The detailed description of the appended figures is intended as a description of the currently preferred embodiments of the present application, and is not intended to represent the only form in which the present application may be practiced. It should be understood that the same or equivalent functions may be accomplished by different embodiments that are intended to be encompassed within the spirit and scope of the present application.

Embodiments of the present application provide methods and apparatus for grouping UEs in the NB-IoT technology. To facilitate understanding, embodiments of the present application are provided under specific network architecture and service scenarios, such as 3GPP 5G NR (new radio), 3GPP LTE R15 and onwards. Persons skilled in the art are well-aware that, with developments of network architecture and new service scenarios, the embodiments in the present application are also applicable to similar technical problems.

An example wireless communication system may include UEs, and a base station (BS). The wireless communication system may further include Mobility Management Entities (MMEs). Persons skilled in the art well know that the number of UEs, BSs, and MMEs in the wireless communication system may vary.

The UEs may include computing devices, such as desktop computers, laptop computers, personal digital assistants (PDAs), tablet computers, smart televisions (e.g., televisions connected to the Internet), set-top boxes, game consoles, security systems (including security cameras), vehicle on-board computers, network devices (e.g., routers, switches, modems), or the like. According to an embodiment of the present application, the UEs may include a portable wireless communication device, a smart phone, a cellular telephone, a flip phone, a device having a subscriber identity module, a personal computer, a selective call receiver, or any other device that is capable of sending and receiving communication signals on a wireless network. In another embodiment of the present application, the UEs may include wearable devices, such as smart watches, fitness bands, optical head-mounted displays, or the like.

Moreover, the UEs may be referred to as subscriber units, mobiles, mobile stations, users, terminals, mobile terminals, wireless terminals, fixed terminals, subscriber stations, UE, user terminals, a device, or by other terminology used in the art. The UEs may communicate directly with a BS via uplink or downlink communication signals.

The BSs may be distributed over a geographic region. In certain embodiments of the present application, a BS may also be referred to as an access point, an access terminal, a base, a base station, a macro cell, a Node-B, an enhanced Node B (eNB), a gNB, a Home Node-B, a relay node, a device, or by any other terminology used in the art. The BSs are generally part of a radio access network that may include one or more controllers communicably coupled to one or more corresponding BSs.

The BSs may be communicatively coupled to one or more packet core networks (PCN), which may be coupled to other networks, like the packet data network (PDN) (e.g., the Internet) and public switched telephone networks, among other networks. These and other elements of radio access and core networks are not illustrated but are well known generally by those having ordinary skill in the art. For example, one or more BSs may be communicatively coupled to a mobility management entity (MME), a serving gateway (SGW), and/or a packet data network gateway (PGW).

The BSs may serve a number of UEs within a serving area, for example, a cell or a cell sector via a wireless communication link. The BSs may directly communicate with one or more of the UEs via communication signals. For example, a BS may serve UEs within a macro cell.

The BSs transmits downlink communication signals to serve the UEs in the time, frequency, and/or spatial domain. Furthermore, the DL communication signals may be carried over wireless communication links. The wireless communication links may be any suitable carrier in licensed or unlicensed radio spectrum. The wireless communication links facilitate communication between the UEs and the BSs.

The wireless communication system is compliant with any type of network that is capable of sending and receiving wireless communication signals. For example, the wireless communication system is compliant with a wireless communication network, a cellular telephone network, a Time Division Multiple Access (TDMA)-based network, a Code Division Multiple Access (CDMA)-based network, an Orthogonal Frequency Division Multiple Access (OFDMA)-based network, a Long Term Evolution (LTE) network, a 3rd Generation Partnership Project (3GPP)-based network, 3GPP 5G network, a satellite communications network, a high altitude platform network, and/or other communications networks.

In one implementation, the wireless communication system is compliant with the long-term evolution (LTE) of the 3GPP protocol, wherein the BS transmits using an orthogonal frequency division multiplexing (OFDM) modulation scheme on the DL and the UEs transmit on the UL using a single-carrier frequency division multiple access (SC-FDMA) scheme or OFDM scheme. More generally, however, the wireless communication system may implement some other open or proprietary communication protocol, for example, WiMAX, among other protocols.

In other embodiments, the BS may communicate using other communication protocols, such as the IEEE 802.11 family of wireless communication protocols. Further, in an embodiment, the BS may communicate over licensed spectrum, while in other embodiments the BS may communicate over unlicensed spectrum. The present application is not intended to be limited to the implementation of any particular wireless communication system architecture or protocol. In another embodiment, the BS may communicate with UEs 101 using the 3GPP 5G protocols.

According to embodiments of the present application, a WUS mechanism may be used for power saving in monitoring paging messages in POs. For example, in response to accessing a wireless communication network, the UE may read wireless communication system information to identify an enabled/disabled status of a WUS mechanism. In response to the WUS mechanism being enabled, the UE may detect a WUS, and then monitor a paging message based on the detected WUS.

POs may be POs in a discontinuous reception (DRX) mode/extended DRX (eDRX) mode, or may be dedicated POs distributed in the DRX mode/eDRX mode. In one eDRX cycle of the eDRX mode, one paging transmission window (PTW) includes one or more POs. There may be multiple shortDRXs (sDRXs) in one PTW. In response to one PTW including multiple sDRXs, the number of PO may be countered based on an sDRX cycle. Moreover, according to LTE R15, the relation of WUS to PO could be 1-to-N, and N could be 1, 2, or 4. That is, one WUS can be mapped to one PO as shown in FIGS. 1A and 1B, or mapped to multiple POs as shown in FIGS. 2A and 2B.

Figure 1A:
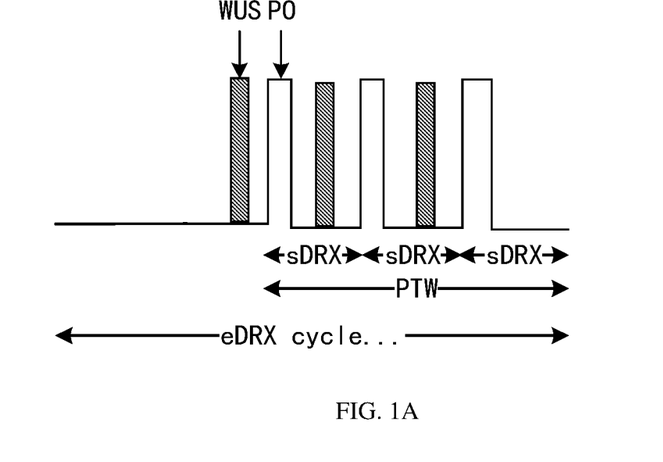
FIG. 1A illustrates a block diagram of mapping WUSs to POs according to an example embodiment of the present application.
Figure 2A:
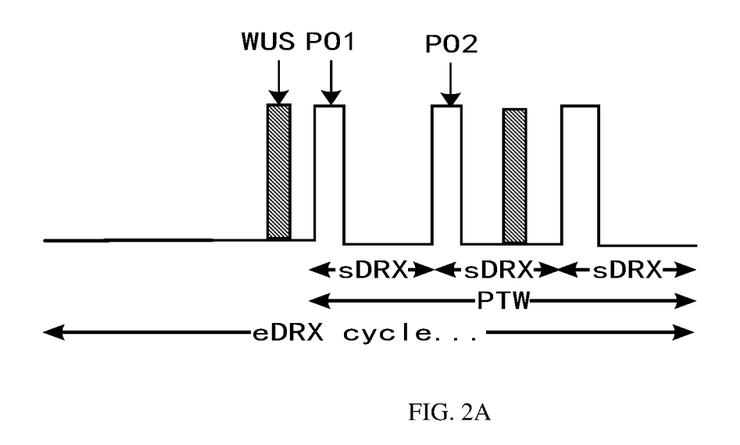
FIG. 2A illustrates a block diagram of mapping WUSs to POs according to yet another example embodiment of the present application.
Figure 2B:
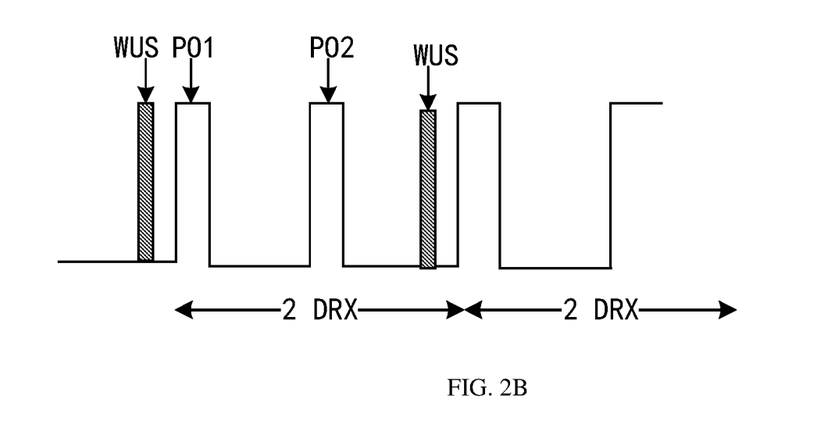
FIG. 2B illustrates a block diagram of mapping WUSs to POs according to a further example embodiment of the present application.

Specifically, FIG. 1A illustrates a block diagram of mapping WUSs to POs according to an example embodiment of the present application, wherein one WUS is mapped to one PO in an eDRX mode.

As shown in FIG. 1A, in one eDRX cycle of the eDRX mode, there are three sDRXs in one PTW, and each WUS is applied to each PO in one sDRX of the PTW. Persons skilled in the art well know that one PTW of the eDRX mode may include different numbers of sDRXs or POs. Thus, the number of sDRXs or POs and the number of WUSs mapped to POs may be different from this embodiment of the present application.

Figure 1B:
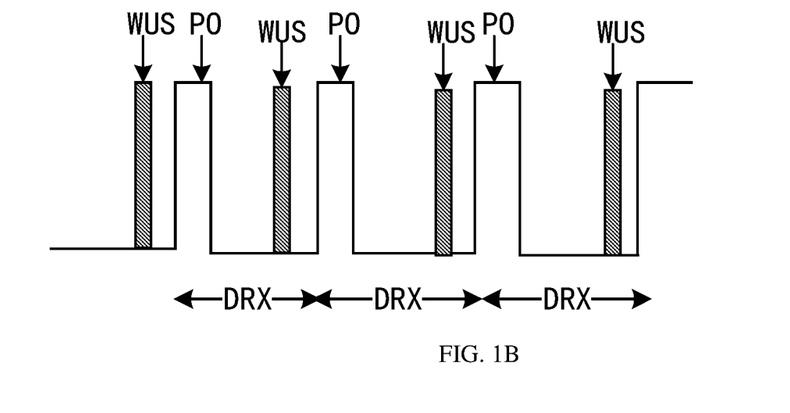
FIG. 1B illustrates a block diagram of mapping WUSs to POs according to another example embodiment of the present application.

FIG. 1B illustrates a block diagram of mapping WUSs to POs according to another example embodiment of the present application, wherein one WUS is mapped to one PO in a DRX mode. As shown in FIG. 1B, each WUS is applied to each PO in one DRX cycle in the DRX mode.

FIG. 2A illustrates a block diagram of mapping WUSs to PTWs according to yet another example embodiment of the present application, wherein one WUS is mapped to multiple POs in an eDRX mode.

As shown in FIG. 2A, in one eDRX cycle of the eDRX mode, there are three sDRXs in one PTW. Each sDRX includes one PO, and one WUS is applied to two POs, i.e., PO1 and PO2 in one PTW of the eDRX mode. In another embodiment of the present application, one WUS may be applied to all POs in one PTW. In addition, persons skilled in the art well know that one PTW of the eDRX mode may include different numbers of sDRXs or POs. Thus, the number of sDRXs or POs and the number of WUSs applied to POs may be various in different embodiments of the present application.

FIG. 2B illustrates a block diagram of mapping WUSs to POs according to a further example embodiment of the present application, wherein one WUS may be mapped to multiple POs in a DRX mode. As shown in FIG. 2B, a one WUS is applied to two POs in 2 DRX cycles. Persons skilled in the art well know that, in other embodiments of the present application, one WUS may be applied to more than two DRX cycles in the DRX mode, for example, one WUS may be applied to three or more POs in the DRX mode.

However, LTE R15 also specifies that multiple UEs, e.g., UEs paged in the same PO will be associated with the same WUS. For example, ten UEs paged in the same PO will detect the same WUS. In the case that a specific UE of the ten UEs will be paged by a base station, the WUS for this specific UE will be sent to all of the ten UEs from the network side. That is, all of the ten UEs may also receive this WUS for the specific UE. Accordingly, although no paging information for other nine UEs will be received, the other nine UEs have to monitor the paging due to receiving a WUS. Apparently, the purpose for power saving in monitoring paging messages in POs cannot be achieved in this case.

To reduce the probability of false wake up, group wake up signal (GWUS) is introduced to support grouping UEs in the WUS mechanism in 5G new radio R16. Specifically, multiple UEs can be divided into different groups, and a specific WUS signal is associated with a specific group of UEs and indicates the PO(s) associated with the specific group of UEs. The specific WUS signal can also be associated with one or more groups of UEs. In some embodiments of the present application, the specific WUS can be named as "common WUS." The number of UE groups can be configured by a base station and can be broadcasted in system information block (SIB). During a paging process, only UE(s) within the specific group may monitor a paging message in the PO(s) based on the detected the specific WUS, while other UEs not included in this specific group will not monitor the paging message in the PO(s) based on the specific WUS. Accordingly, during the paging process, more power of UEs could be saved in the WUS mechanism applying the GWUS scheme than that using the legacy R15 WUS scheme.

Figure 3A:
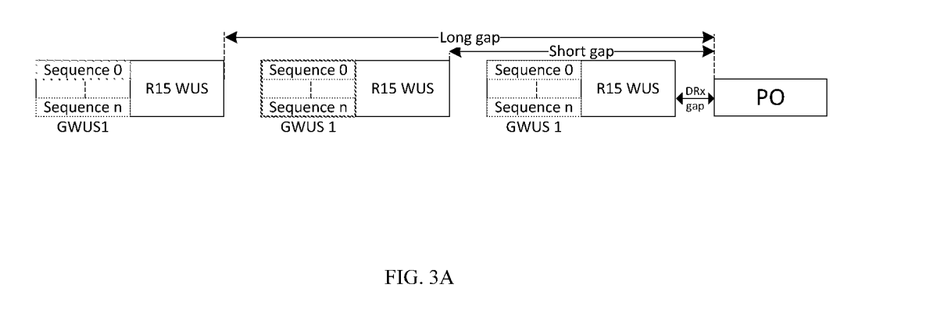
FIGS. 3A and 3B illustrate a block diagram of the configuration of one GWUS resource according to some embodiments of the present application.
Figure 3B:
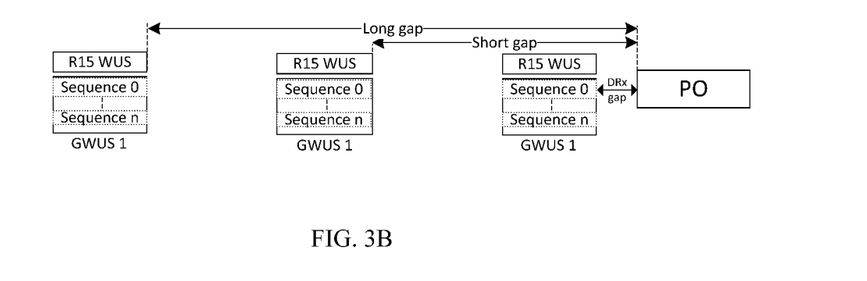
Figure 3C:
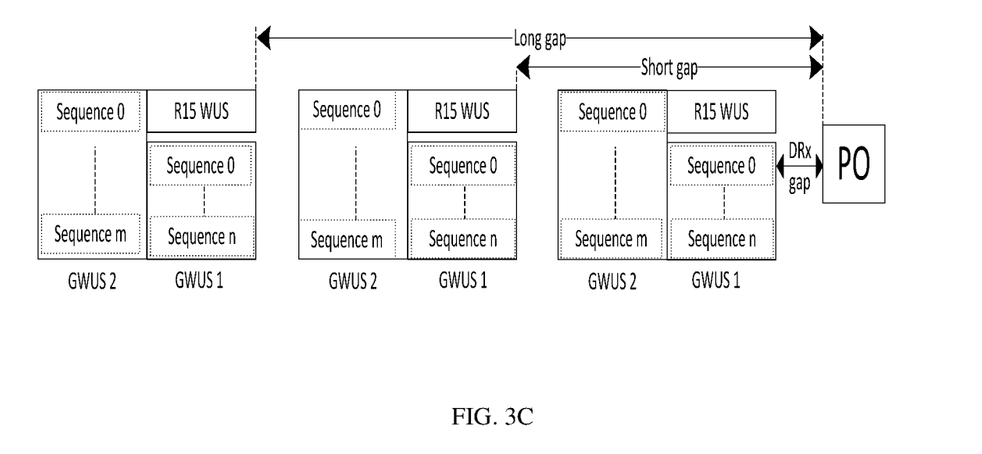
FIG. 3C illustrates a block diagram of the configuration of two GWUS resources according to some embodiments of the present application.

FIGS. 3A-3C respectively illustrate a block diagram of WUS resource configuration for GWUS according to some embodiments of the present application.

Specifically, FIG. 3A illustrates a block diagram of the configuration of one GWUS resource according to some embodiments of the present application, wherein the resource for GWUS, i.e., GWUS 1 and the R15 WUS (i.e., legacy WUS hereafter the same) resource are multiplexed based on time division multiplexing. GWUS resource is the resource for GWUS. In the resource for GWUS, there can be a group of WUS sequences, e.g., sequence 0 to sequence n before the legacy R15 WUS resource in time domain. Each WUS sequence is associated with a UE group.

FIG. 3B illustrates a block diagram of the configuration of one GWUS resource according to some embodiments of the present application, wherein the GWUS resource, i.e., GWUS 1 and the legacy WUS resource are multiplexed based on code division multiplexing. The GWUS resource can be occupied by a group of WUS sequences e.g., sequence 0 to sequence n overlapping with the legacy WUS resource in time domain and is multiplexed with the legacy WUS resource in code domain. Each WUS sequence is associated with a UE group.

FIG. 3C illustrates a block diagram of the configuration of two GWUS resources according to some embodiments of the present application, wherein one GWUS resource, i.e., GWUS 1 is a group of WUS sequences e.g., sequence 0 to sequence n before the legacy WUS, while the other GWUS resource, GWUS 2 is a group of WUS sequences e.g., sequence 0 to sequence m overlapping with the legacy WUS in time domain and is multiplexed with the legacy WUS resource in code domain. Each WUS sequence is associated with a UE group.

At least for the group WUS in the same WUS resource, legacy WUSs with phase shifts is designed for a group of WUS sequence according to $w\_(group)(m')=w(m') \exp(j2\pi gm/G)$, wherein $w(m')$ is the legacy WUS, $G=132$, $g=14*(UE\_group\_index+1)$, $0 \leq UE\_group\_index \leq 7$. Similar to a legacy WUS, a GWUS resource can also be associated with N (one of $\{1, 2, 4\}$) POs in a PTW. Once a UE detects its WUS, it will monitor the following N POs. For the same PO, a UE can detect the corresponding WUS/GWUS by DRX gap, or by eDRX gap. All gaps (or offset, hereafter the same) use the same GWUS configuration on the number of UE groups and WUS resource allocation. The eDRX gap could include a short gap or a long gap as shown in FIGS. 3A-3C. In addition, the eDRX gap may be configured individually in the case it is separated from the DRX gap. A UE can apply the gap type based on the DRX or eDRX configuration and its capability on grouping rules for WUS.

According to embodiments of the present application, there are one or more UE grouping rules, e.g., a UE-ID-based grouping rule, a paging-probability-information-based grouping rule, or a combination of several grouping rules. The combination of the UE-ID-based grouping rule with the paging-probability-information-based grouping rule can be the UE-ID-based grouping rule firstly and paging-probability-information-based grouping rule secondly, or the paging-probability-information-based grouping rule firstly and UE-ID-based grouping rule secondly.

An exemplary embodiment is grouping ten UE groups under a combination of the UE-ID-based grouping rule firstly with the paging-probability-information-based grouping rule secondly. The BS can configure 10 WUSs or GWUS sequences for this grouping, and the value which UE-ID will mod for the UE-ID-based grouping rule is configured as 5, i.e., 5 groups. The zone or threshold for the paging-probability-information-based grouping rule is [0, 0.5) and [0.5, 1], or group ID [0, 5) and [5, 9] at the MME side. Thus, the ten UEs can be grouped into 5 groups based on the formulation (UE-ID mod 5), and the UE in the same group could be further grouped based on its paging-probability-information, wherein the UE with paging-probability-information 0.5 and the value 3 of the formulation (UE-ID mod 5) will be associated with the No. 7 WUS sequence, the number 7 is computed by the formulation (3 mod 5)*(10/5)+1=7. The number of sequences is associated with the value of the formulation UE-ID mod the number of the group for UE-ID-based grouping rule, the number of UE groups for the combined grouping rule, the number of UE group for the UE-ID-based grouping rule, and the group ID in the groups for paging-probability-information-based grouping rule in each UE-ID-based group. The number of sequence can be computed by (value by UE ID mod the number of UE group for the UE-ID-based grouping rule)*[the number of UE group for combined grouping rule/the number of UE group for UE-ID based grouping]+the group ID in the groups for the paging-probability-information-based grouping rule in each UE-ID-based group+offset. The offset number could be optional. The offset could be the initial group number for the combined of the UE-ID-based grouping rule with the paging-probability-information-based grouping. For example, the groups from group 4-13 are used for the combined grouping rule, then the "offset" is 4, and the UE group for WUS is group 11.

Another exemplary embodiment is ten UE groups under a combination of the paging-probability-information-based grouping rule firstly with the UE-ID-based grouping rule secondly. The BS can configure 10 WUSs or GWUS sequences for this grouping, and the zone or threshold for the paging-probability-information-based grouping rule is [0, 0.5) and [0.5, 1], or group ID [0, 5) and [5, 9] at the MME side. The value to mod UE-ID for UE-ID based grouping is configured as 5, and the UE with paging-probability-information 0.5 and the value 3 of the formulation (UE ID mod 5) will be associated with the No. 7 WUS sequence. The number 7 is computed by the formulation 1*5−1+mod(3, 5)=7. The number of sequence is associated with at least one of the value computed by the formulation UE ID mod the number of UE group for UE-ID based grouping rule in each paging-probability-information-based group, the number of UE group for the combined grouping rule, the number of UE group for the UE-ID based grouping rule in each paging-probability-information-based group, and the UE's group ID for paging-probability-information-based group. The number of sequence is computed by (the UE's group ID for the paging-probability-information based grouping rule)*[the number of UE group for the UE-ID based grouping rule in each paging-probability-information-based group]−1+UE ID mod the number of UE group for UE-ID based grouping rule in each paging-probability-information based group+offset. The offset number could be optional. The offset can be the initial group number for the combined of the UE-ID-based grouping rule with the paging-probability-information-based grouping. For example, the groups from group 4-13 are used for the combined grouping rule, then the offset is 4, and the UE group for WUS is group 11.

The paging probability threshold for grouping UEs can be defined by the BS or specification. 1-6 can be defined under the paging-probability-based-formation grouping rule, while groups 7-10 can be defined under the UE-ID-based grouping rule. For another example, a combination of the UE-ID-based grouping rule with the paging-probability-information-based grouping rule can be under any grouping rules, a WUS to a UE can only trigger all UEs in the same group to monitor the following PO associated with the WUS.

In the following embodiments, the term "WUS" applied can mean the GWUS. The GWUS could include the Release 15 WUS.

Specifically, under a UE-ID-based grouping rule, the UEs will be grouped according to their respective IDs. For example, in the case that there are ten UEs to be grouped into 4 groups for WUS, UEs can be grouped based on the result that its UE ID mods the group number for the UE-ID-based grouping rule. For example, the UEs with IDs 0-4 will have value 0 computed from the formulation (UE ID mod 4), and they will be grouped into the first group; while the UEs with IDs 5-7 will have value 1 computed from the formulation (UE ID mod 4), and they will be grouped in the second group. The WUS to UE1 will also trigger UE0, UE2, UE3 and UE4 to monitor the following paging but will not trigger other UEs in different groups. In another example, the group in physical layer can be associated with one or more logic UE groups in the cell or eNB side by a grouping rule. UEs with respective value from 0 to 3 computed from the formulation (UE ID mod 4) can be grouped into the first group, while UEs with respective value from 4 to 7 computed from the formulation (UE ID mod 4) can be grouped into the second group.

A paging-probability-information-based grouping rule can also be named as a service-based grouping rule. The basic idea of a paging-probability-information-based grouping rule is to make UEs with the same or similar paging-probability or service type be paged in the same group to reduce the false wake up probability. For example, some UEs may be in the service of receiving network commands to switch on lights, some other UEs may be in the service of receiving network commands to trigger a device to send an uplink report as a result of the network commands, e.g., a request for a smart meter reading. These UEs can be grouped into the same group due to similar service types.

A key parameter to determine the paging-probability-information-based grouping rule or named as service-based grouping rule is paging probability information. The paging probability information can be the paging probability, such as a probability value from 0 to 1, or a probability level value from low to high, or a paging frequency, e.g., 100 times per second. The paging probability information can also be paging probability zone or group information. For example, zone_0 or group_0 can present a group of UEs with the paging probability value from 0 to 0.2, or a low probability level, or paging frequency below 100 times per second, or service period under 100 ms, or some performance features defined in MME. The paging probability group information can be configured to UEs by an MME via a non-access stratum (NAS) procedure. An MME can determine the paging probability information of UEs, which can be collected from an operation administration and maintenance (OAM). The MME can transmit the paging probability information at least to a BS. The BS will record and store the paging probability information, so that it can determine grouping rule information based on the UE distribution on the paging probability.

In some embodiments of the present application, the MME can transmit the definition of paging probability information to the BS. The definition of paging probability information can be the threshold information of the paging probability information in the MME or the range information of the paging probability information in the MME. The BS will record and store the definition of paging probability information, so that it can determine grouping threshold or zone at the BS side for paging-probability-information-based grouping. The definition of paging probability information could be transmitted by S1 paging information. The definition of paging probability information can be transmitted by the S1 message from the MME, or stored by the BS. The S1 message can be at least one of the messages: MME CONFIGURATION UPDATE, MME CONFIGURATION TRANSFER, MME DIRECT INFORMATION TRANSFER, and ENB CONFIGURATION UPDATE ACKNOWLEDGE.

According to some embodiments of the present application, an MME can also transmit default group information to a BS via S1 message. The default group can be a group with lowest paging probability information, highest paging probability information, or dedicated paging probability information. For example, the lowest probability information can be with the lowest paging probability value 0, or with lowest paging probability group ID/index 0. The highest probability information can be with the highest paging probability value 1, or with lowest paging probability group ID/index, e.g., 4.

The dedicated probability information can be with a dedicated paging probability value, e.g., 0.5; or with a dedicated paging probability group ID/index, e.g., 3. In some embodiments of the present application, the MME can also transmit the default group information to UEs during a NAS procedure. In some embodiments of the present application, the MME can also transmit the default group information to a BS, e.g., eNB by S1 paging message. A UE can receive the default group information, and will detect the WUS associated with the default group information. For example, the default group can be a group with lowest paging probability information, the group_3 is used for the lowest paging probability information by an eNB configuration, and then the UE will detect the WUS associated with the group_3. The default group can be used by a UE with a dedicated service type. For example, the UE with mobile terminated (MO) service will apply the default group with the lowest paging probability.

A BS may support a plurality of group rules by independent WUS sequences, for example, group IDs from 0 to 3 can be used under the UE-ID-based grouping rule, group IDs from 4 to 7 can be used under the paging-probability-information-based grouping rule. However, the UE grouping rules supported in the BS, or in the radio access network (RAN) side may different from that supported in the UE side. For example, a BS may support a paging-probability-information-based grouping rule, while a UE may not support the paging-probability-information-based grouping rule due to its capability or due to the MME of the UE cannot get the paging probability information of the UE at all.

Figure 4:
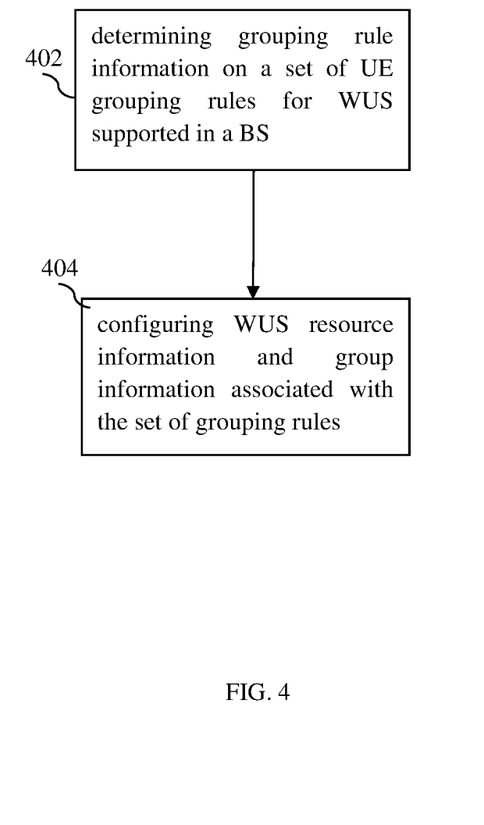
FIG. 4 illustrates a flowchart demonstrating a method for grouping UEs according to some embodiments of the present application.

FIG. 4 illustrates a flowchart of a method for grouping UEs according to some embodiments of the present application, which can be performed in a BS, e.g., an eNB.

As shown in FIG. 4, in the RAN side, a BS may determine grouping rule information on a set of UE grouping rules for WUS supported in the BS in step 402. According to some embodiments of the present application, the grouping rule information may include at least one of a UE-ID-based grouping rule, a paging-probability-information-based grouping rule, and a combination of the UE-ID-based grouping rule with the paging-probability-information-based grouping rule. The determined grouping rule information can be implicitly or explicitly configured. For example, in the case that no paging-probability-information-based grouping rule being configured for UEs, it implicitly indicates that the UE-ID-based grouping rule is configured. For another example, it implicitly indicates that the UE-ID-based grouping rule is configured if there are one or more groups for WUS resource that are not used by paging-probability-information-based grouping rule. For another example, it implicitly indicates that the UE-ID-based grouping rule is configured if there are one or more groups for WUS resource that are not used by paging-probability-information-based grouping rule.

For example, the grouping rule information may include a paging-probability-information-based grouping rule. For the paging-probability-information-based grouping rule, the grouping rule information may include the UE group ID in the RAN side based on paging probability information. The BS may implicitly or explicitly configure the grouping rule information that UEs with paging probability values less than 0.3 will be in group 0. Accordingly, a UE with a paging probability value of 0.2 will be in group 0 for WUS in the RAN side. In another example, the BS may implicitly or explicitly configure the grouping rule information that UEs with paging probability group information less than paging probability group 4 will be in group 0 for WUS in RAN side. Accordingly, a UE with paging probability group information of group 0 will be in group 0 for WUS in the RAN side.

In step 404, the BS may configure WUS resource information and group information associated with the set of grouping rules for UEs. The configured WUS resource information and group information associated with the set of grouping rules are for UEs, so that a UE can compute its group ID based on the grouping rule supported in the UE and the configured group information.

The group information associated with the set of grouping rules can also be configured in an implicit or explicit way. According to some embodiments of the present application, the group information can be at least one of group number information on a UE-ID-based grouping rule, group number information on a paging-probability-information-based grouping rule, and group number information on a combination of grouping rules at least including the UE-ID-based grouping rule and the paging-probability-information-based grouping rule.

According to some embodiments of the present application, a BS can determine the grouping rule information on the set of grouping rules for WUS supported in the BS based on the UE distribution information received from an MME. The UE distribution information is associated with the information on paging probabilities of UEs. In some embodiments of the present application, the UE distribution information can be associated with time information, wherein the time information could be a timer, a time range, a time period or a time duration.

Figure 5:
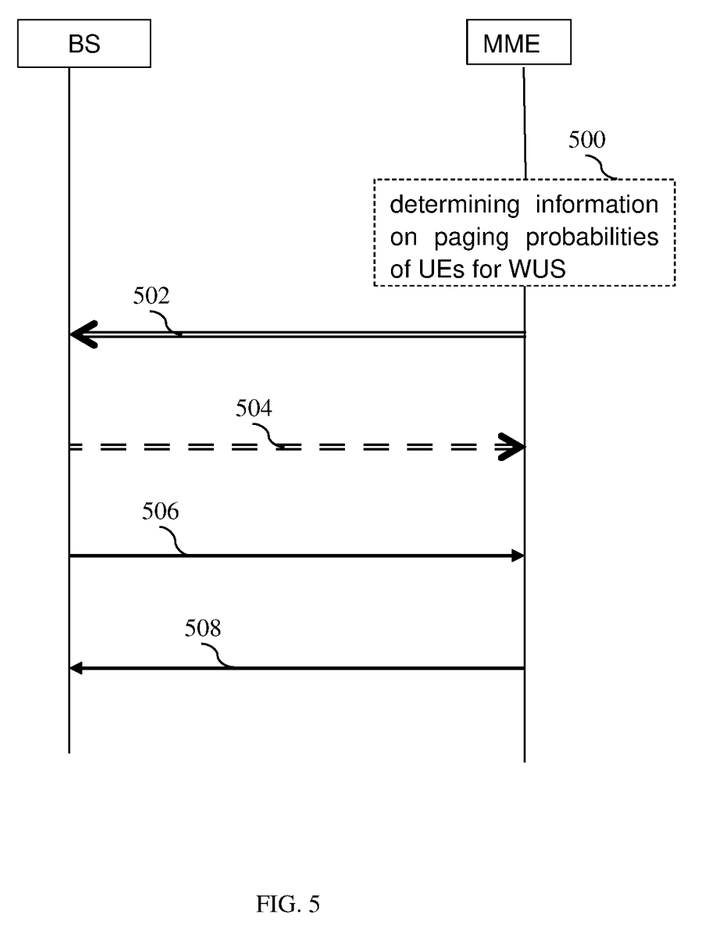
FIG. 5 illustrates an exemplary communication procedure between a BS and an MME according to some embodiments of the present application.

FIG. 5 illustrates an exemplary communication procedure between a BS and an MME according to some embodiments of the present application.

As shown in FIG. 5, an MME can determine the information on paging probabilities of UEs in step 500, which can be received from the OAM. The MME can transmit the information on paging probabilities of UEs for WUS to a BS. When a UE moves to a new tracking area (TA), its paging probability information can be notified to the new MME by the UE or by the previous MME. For example, when a UE moves to a new TA, the new MME associated with the UE can require the information of the UE from the previous MME. The previous MME associated with the UE can respond the requirement at least with the paging probability information of the UE. In another example, when a UE moves to a new TA, the new MME associated with the UE can require the information of the UE from the UE. The UE will respond the requirement at least with the paging probability information of the UE.

In step 502, the MME can transmit the UE distribution information associated with information on paging probability of UEs, and the BS can receive the UE distribution information associated with information on paging probability of UEs from the MME. According to some embodiments of the present application, the UE distribution information can indicate at least one paging probability information zone and a number of UEs in each of the at least one paging probability information zone. Each of the at least one paging probability information zone can also be named as a paging probability information zone threshold. A paging probability information zone can be a paging probability zone indicating a paging probability range or a paging probability group zone indicating a range of paging probability groups. For example, paging probability zone information can be a paging probability range of [0.2 0.4], which could be defined as group ID information configured in the MME side, e.g., group 1 in the MME side. In another example, the paging probability zone information can be a range of paging probability groups, such as UE groups [0, 3] in MME, wherein UE groups [0, 3] means group0, group1, group2, group3.

According to some other embodiments of the present application, the UE distribution information can indicate at least one paging probability information zone and a percent of UEs in each of the at least one paging probability information zone. The UE distribution information can also indicate a total number of UEs in all of the at least one paging probability information zone, or a number of UEs in one of the at least one paging probability information zone. Accordingly, a BS can determine the number of UEs in each paging probability information zone.

Both the number of UEs and percent of UEs the in each of the at least one paging probability information zone are associated with a paging area. The paging area can be a paging area of the BS; a paging area of a cell; a paging area of RAN-based notification area (RNA); a paging area of TA; or a dedicated paging area of an area of at least one BS, at least one cell, at least one RNA or at least one TA.

According to some embodiments of the present application, the BS can transmit at least one suggested paging probability information zone in step 504, so that the BS can obtain improved UE distribution information to uniformly distribute the UEs in each paging probability information zone. Accordingly, the MME can transmit the improved UE distribution information to the BS. In some embodiments of the present application, the suggested paging probability information zone can be included in an acknowledge message in response to the UE distribution information. For example, a BS may only need the UE distribution information on UEs with a dedicated paging probability information zone. The dedicated paging probability zone can be a value with paging probability less than 0.5. Then, the MME will give the BS, e.g., an eNB the UE distribution information on UEs with paging probability less than 0.5. The dedicated paging probability zone can also be a range of paging probability group, e.g., group IDs ranged from 0 to 5. Then, the MME will give the eNB the UE distribution information on UEs with paging probability group from group 0 to group5. In some embodiments of the present application, the BS can suggest a percent of UEs, a number of UEs, and/or a number of UE groups in each paging probability information zone. For example, the suggested percent in each paging probability information zone can be 25%. After receiving the suggested percent 25%, the MME may count four paging probability information zones as the BS suggested. The MME can also transmit the number of UE groups in each paging probability information zone.

The WUS resource can be different for each gap type. According to some embodiments of the present application, in step 506, a BS may transmit group information for WUS supported in the BS to the MME. The group information for WUS supported in the BS can help the MME determine the paging probability zone information on UE distribution. For example, when there are 8 UE groups for each WUS resource, and 2 WUS resource for a PO, which means 16 UE groups are used for WUS detection; the MME may determine the number of UEs on 16 paging probability zones from paging probability value of 0 to paging probability value of 1.

The group information for WUS supported in the BS may include a number of UE groups for WUS supported in the BS, wherein the WUS is associated with one or more POs. The number of UE groups for WUS supported in the BS can be at least one of a maximum number of UE groups for WUS supported in the BS and the number of UE groups for WUS applied in the BS.

In some embodiments of the present application, the number of UE groups for WUS supported in the BS can include a number of WUS resources associated with the one or more POs, and be per WUS resource, per gap type (e.g., DRX gap, or eDRX gap; or DRX gap, eDRX short gap, or eDRX long gap), or per WUS source and per gap type. For example, the group information for WUS supported in the BS may include a number of WUS resources associated with the one or more POs, and the number of UE groups for WUS supported in the BS is a number of UE groups per WUS resource for WUS. In another example, the group information for WUS supported in the BS comprises a number of WUS resources associated with the one or more POs, and the number of UE groups for WUS supported in the BS is a number of UE groups per gap type for WUS. In yet another example, the group information for WUS supported in the BS comprises a number of WUS resources associated with the one or more POs, and the number of UE groups for WUS supported in the BS is a number of UE groups per WUS resource and per gap type for WUS.

According to some embodiments of the present application, the number of UE groups for WUS supported in the BS is at least one of a number of UE groups for WUS supported in the BS for a UE-ID-based grouping rule, a number of UE groups for WUS supported in the BS for a paging-probability-information-based grouping rule, and a number of UE groups for WUS supported in the BS for a combination of the UE-ID-based grouping rule with the paging-probability-information-based grouping rule. For example, the number of UE groups for WUS supported in the BS can be a maximum number of UE groups based on the BS' capability for WUS per WUS resource for a UE-ID-based grouping rule, and/or a number of UE groups applied in the BS for WUS per WUS resource for a UE-ID-based grouping rule.

In some embodiments of the present application, in step 508, the BS may receive suggested group information for WUS supported in the BS from the MME. For example, the suggested group information for WUS supported in the BS can be included in an acknowledge message from the MME. The acknowledge message can be in response to the transmitted group information for WUS supported in the BS. The suggested group information for WUS supported in the BS may be a suggested number of UE groups supported in the BS per WUS resource, a suggested number of UE groups per gap type, or a suggested number of UE groups per WUS resource and per gap type. According to some embodiments of the present application, the suggested group information for WUS supported in the BS can include the WUS resource information. The WUS resource information can be the number of WUS resource applied in BS, or the maximum number of WUS resource based on the BS's capability.

According to some embodiments of the present application, the suggested group information for WUS supported in the BS can include the WUS resource information. The WUS resource information can be the number of WUS resource applied in BS, or the maximum number of WUS resource based on the BS's capability.

According to some embodiments of the present application, the suggested group information for WUS supported in the BS may include a suggested number of UE groups for WUS supported in the BS, wherein the WUS is associated with one or more POs. The suggested number of UE groups for WUS supported in the BS can be at least one of a suggested maximum number of UE groups for WUS supported in the BS and the suggested number of UE groups for WUS applied in the BS.

In some embodiments of the present application, the suggested number of UE groups for WUS supported in the BS can include a suggested number of WUS resources associated with the one or more POs, and be per WUS resource, per gap type (e.g., DRX gap, or eDRX gap; or DRX gap, eDRX short gap, or eDRX long gap), or per WUS source and per gap type. For example, the suggested group information for WUS supported in the BS may include a number of WUS resources associated with the one or more POs, and the number of UE groups for WUS supported in the BS is a number of UE groups per WUS resource for WUS. In another example, the suggested group information for WUS supported in the BS comprises a number of WUS resources associated with the one or more POs, and the number of UE groups for WUS supported in the BS is a number of UE groups per gap type for WUS. In yet another example, the suggested group information for WUS supported in the BS comprises a number of WUS resources associated with the one or more POs, and the number of UE groups for WUS supported in the BS is a number of UE groups per WUS resource and per gap type for WUS.

According to some embodiments of the present application, the suggested number of UE groups for WUS supported in the BS is at least one of a number of UE groups for WUS supported in the BS for a UE-ID-based grouping rule, a number of UE groups for WUS supported in the BS for a paging-probability-information-based grouping rule, and a number of UE groups for WUS supported in the BS for a combination of the UE-ID-based grouping rule with the paging-probability-information-based grouping rule. For example, the suggested number of UE groups for WUS supported in the BS can be a maximum number of UE groups based on the BS' capability for WUS per WUS resource for a UE-ID-based grouping rule, and/or a number of UE groups applied in the BS for WUS per WUS resource for a UE-ID-based grouping rule.

Although steps 502, 504, 506 and 508 are illustrated in the same figure, persons skilled in the art should understand that steps 506 and 508 are not continuous to steps 502 and 504, and they can be performed separately from steps 502 and 504. In addition, all the messages communicated between the BS and MME can be in cell-level.

In some embodiments of the present application, a BS may receive the paging probability group information of a UE and the information of paging probability zone of the paging probability group information from an MME, so that the BS can determine to which paging-probability-information-based group the UE belongs. The paging probability group information of a UE could be received by S1 paging information. The information of paging probability zone of the paging probability group information can be received by the S1 message from an MME, or stored by a BS e.g., eNB. The S1 message can be at least one of the messages: MME CONFIGURATION UPDATE, MME CONFIGURATION TRANSFER, MME DIRECT INFORMATION TRANSFER, and ENB CONFIGURATION UPDATE ACKNOWLEDGE.

As stated above, a BS may support multiple UE grouping rules by independent WUS sequences. Accordingly, there are several UE grouping rules in the perspective of UEs, and some of them may even not be supported in the UE. The UE has to determine its UE grouping rule in a dedicated BS before identifying its group for WUS.

Figure 6:
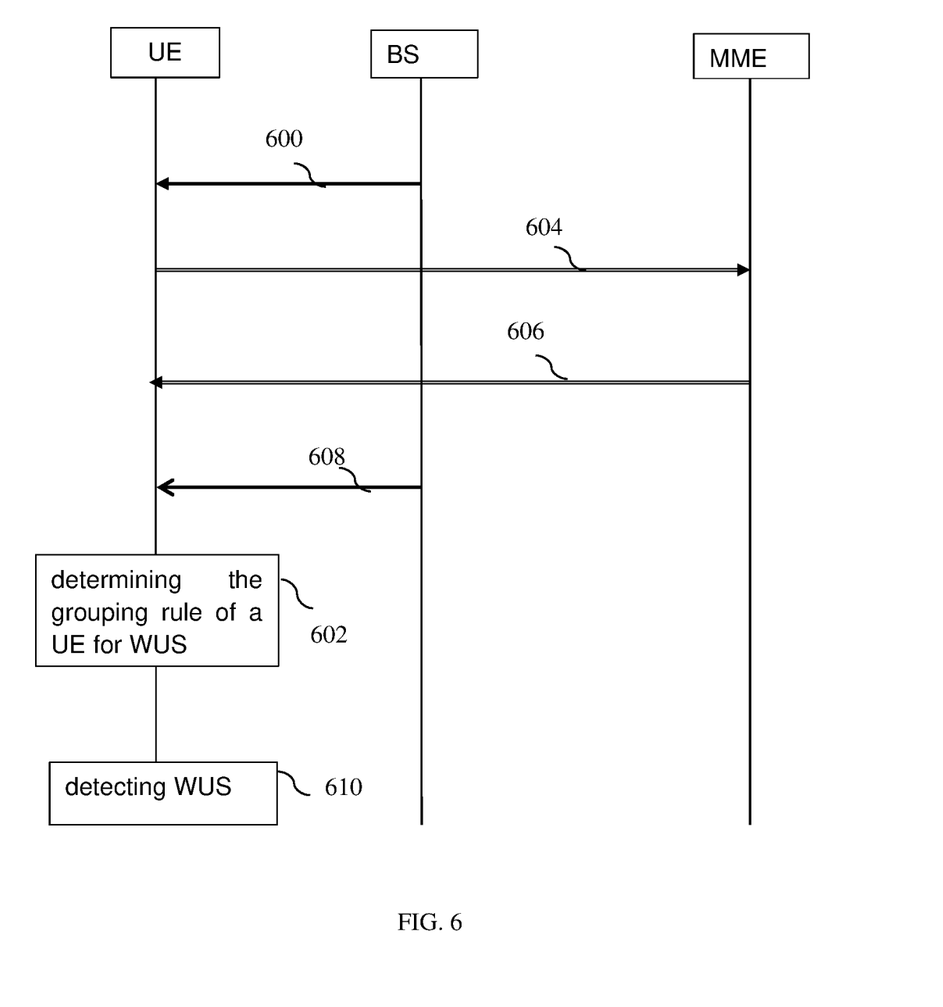
FIG. 6 illustrates a flowchart demonstrating a method for grouping UEs in a wireless communication system according to some embodiments of the present application.

FIG. 6 illustrates a flowchart demonstrating a method for grouping UEs in a wireless communication system according to some embodiments of the present application.

As shown in FIG. 6, configuration information on grouping rule, e.g., the grouping rule information on a set of UE grouping rules for WUS supported in a BS can be received from the BS via SIB in step 600. For example, the grouping rule information may indicate that the paging probability zone for each group is as Table 1. The grouping rule information shown in Table 1 explicitly indicates that groups 4-9 are used for paging-probability-information-based grouping rule, while implicitly indicates that other groups are used for UE-ID-based grouping rule. In Table 1, the UE will be in the group where the UE's paging probability information is satisfied with grouping definition. The boundary between two groups can be specifically defined in different embodiments, so that they are not overlapped.

TABLE 1

| Group ID | paging probability |
|---|---|
| Group 4 | 0-0.2, the meaning of 0.2 could be the value < 0.2 or <= 0.2 |
| Group 5 | 0.2-0.4 |
| Group 6 | 0.4-0.5 |
| Group 7 | 0.5-0.7 |
| Group 8 | 0.7-0.8 |
| Group 9 | 0.8-1, >0.8, >=0.8 |

Configuration information on WUS resource information and group information associated with the set of grouping rules can also be received from the BS. For example, WUS resource information may indicate two WUS resources to be detected per gap type. The group information may indicate that there are 10 UE groups for each WUS resource in each gap type applied in the BS, and/or groups 0-3 are used for the UE-ID-based grouping rule, groups 4-9 are used for paging probability based grouping rule.

Based on the received configuration information, such as the grouping rule information and WUS resource information etc., and the capability information on grouping rules of a UE; the UE can determine its grouping rule for WUS in step 602. The capability information on grouping rules can indicate that all grouping rules for WUS are mandatory for the UE. According to some embodiments of the present application, the capability information on grouping rules can include information on the priority of grouping rules in the UE, which can be configured by the UE or the MME associated with the UE, or is predefined. That is, a UE can determine the grouping rule of the UE for WUS based on the information on priority of grouping rules. In some embodiments of the present application, a grouping rule with the highest priority in the set of grouping rules supported in the BS can be determined as the grouping rule of the UE for WUS.

The priority of grouping rules in the UE can be: priority of a combination of UE-ID-based grouping and paging-probability-information-based grouping is higher than that of the paging-probability-information-based grouping, and priority of the paging-probability-information-based grouping is higher than that of the UE-ID-based grouping. In another example, the priority of grouping rules in the UE can be: priority of the paging-probability-information-based grouping is higher than that of the UE-ID-based grouping. In yet another example, the priority of grouping rules in the UE can be: priority of the paging-probability-information-based grouping is higher than that of the UE-ID-based grouping. According to some embodiments of the present application, the priority of grouping rules in the UE may define that priority of the UE-ID based grouping rule is higher than that of a combination of UE-ID-based grouping rule and paging-probability-information-based grouping rule, and the priority of a combination of UE-ID-based grouping rule and paging-probability-information-based grouping rule is higher than that of the paging-probability-information-based grouping rule. According to some embodiments of the present application, the priority of grouping rules in the UE may define that priority of the UE-ID-based grouping is higher than that of the paging-probability-information-based grouping. According to some other embodiments of the present application, the priority of grouping rules in the UE can just limit that the priority of the UE-ID-based grouping is the lowest.

As shown in step 604, according to some embodiments of the present application, a UE may report its capability information on grouping rules to the MME associated with the UE. The reported capability information on grouping rules can also include information on priority of grouping rules in the UE.

In step 606, the MME may transmit an acknowledge message in response to the reported capability information, which may include configuration information for confirming the priority of grouping rules or changing the priority of grouping rules. Accordingly, the UE may receive the acknowledge message.

In some embodiments of the present application, a UE can compute its group ID based on the received configuration information and its paging probability information, which can be received from an MME by the NAS procedure. For example, the paging probability of the UE is 0.2, and the UE will determine that the grouping rule for it is paging-probability-information-based grouping rule, and it will belong to group 4.

According to some embodiments of the present application, the paging probability information of a UE may be paging probability zone information. The MME will send the paging probability zone information in the MME side to the BS. Similarly, information from the BS as shown in Table 2 implicitly or explicitly indicates that there are 10 UE groups for one or two WUS resource in each gap type, and groups 0-3 are for UE-ID-based grouping rule, and groups 4-9 are for paging-probability-information-based grouping rule. In the case that paging probability zone information of a UE is group 0 in the MME side, the UE can determine that the grouping rule for it is paging-probability-information-based grouping rule, and it will belong to group 4.

TABLE 2

| Group ID | paging probability | paging probability zone |
|---|---|---|
| Group 4 | 0-0.2 the meaning of 0.2 could be the value < 0.2, or <= 0.2 | Groups 0-1 in MME |
| Group 5 | 0.2-0.4 | Groups 2 in MME |
| Group 6 | 0.4-0.5 | Groups 3-4 in MME |
| Group 7 | 0.5-0.7 | Groups 5 in MME |
| Group 8 | 0.7-0.8 | Groups 6-8 in MME |
| Group 9 | 0.8-1, >0.8, >=0.8 | Groups 8-max, the meaning of groups 8 could be the group > group 8, or >= group 8 in MME |

In the case that a UE determines that it will apply a UE-ID-based grouping rule, it will compute its group ID based on the result that its UE ID mods the group number for the UE-ID-based grouping rule. For example, in the case that the group number for the UE-ID-based grouping rule is 4, and the ID of a UE is 5, the UE will compute that its group ID is 21, which is the second group of the UE groups for the UE-ID-based grouping rule. In some embodiments of the present application, as stated above, a UE can directly receive default group information from an MME during a NAS procedure, wherein the default group can be a group with lowest paging probability information, highest paging probability information, or dedicated paging probability information.

In some embodiments of the present application, the BS may page a grouping rule to the UE in a paging message in step 608. The grouping rule may include: a UE-ID-based grouping rule, a paging-probability-information-based grouping rule, or a combination of the UE-ID-based grouping rule and paging-probability-information-based grouping rule, etc.

After determining the grouping rule supported in the UE and its group ID, the UE will detect the WUS associated with its group ID in step 610. According to some embodiments of the present application, the capability information on grouping rules may indicate that the UE does not support any grouping rule indicated in the grouping rule information. In this case, the UE may detect the WUS based on a UE-ID-based grouping rule or based on a legacy R15 WUS scheme as stated above. After detecting the WUS associated with its group ID, the UE will monitor the following PO associated with the WUS.

Figure 7:
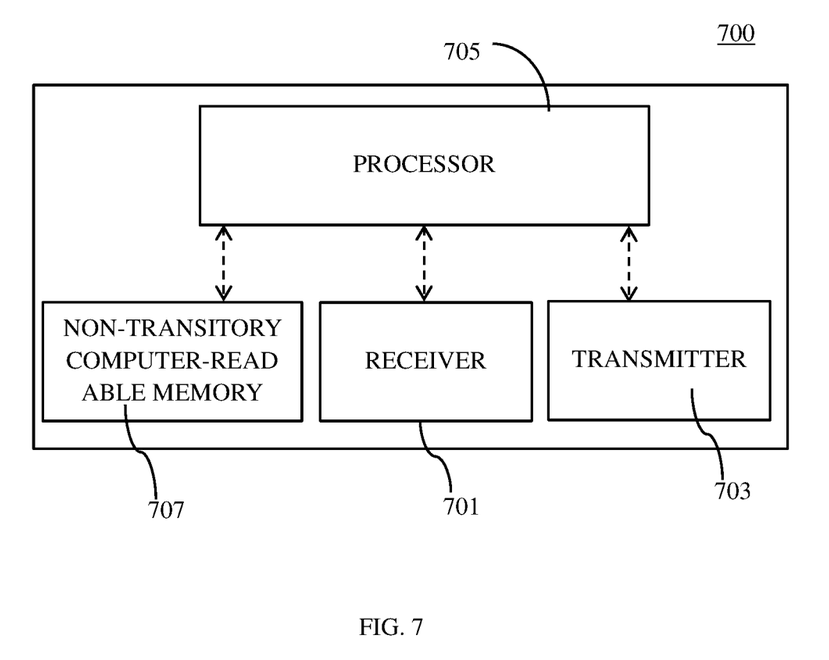
FIG. 7 illustrates a block diagram of an apparatus according to some embodiments of the present application.

FIG. 7 illustrates a block diagram of an apparatus according to some embodiments of the present application. In some embodiments of the present application, the apparatus 700 may be a BS as illustrated in above embodiments of the present application. In some other embodiments of the present application, the apparatus 700 may be an MME as illustrated in above embodiments of the present application. In some yet other embodiments of the present application, the apparatus 900 may be a UE as illustrated in above embodiments of the present application.

As shown in FIG. 7, the apparatus 700 may include a receiver 701, a transmitter 703, a processor 705, and a non-transitory computer-readable medium 707. The non-transitory computer-readable medium 707 has computer executable instructions stored therein. The processor 705 is configured to be coupled to the non-transitory computer readable medium 707, the receiver 701, and the transmitter 703. It is contemplated that the apparatus 700 may include more computer-readable mediums, receiver, transmitter and processors in some other embodiments of the present application according to practical requirements. In some embodiments of the present application, the receiver 701 and the transmitter 703 are integrated into a single device, such as a transceiver. In certain embodiments, the apparatus 700 may further include an input device, a memory, and/or other components.

In some embodiments of the present application, the non-transitory computer-readable medium 707 may have stored thereon computer-executable instructions to cause a processor to implement the method according to embodiments of the present application.

For a NAS procedure in some embodiments of the present application, it can be at least one of a TA updating procedure and attach procedure.

For the information transmitted from an MME to an eNB in embodiments of the present application, it can be over at least one of the messages: MME CONFIGURATION UPDATE, MME CONFIGURATION TRANSFER, MME DIRECT INFORMATION TRANSFER, and ENB CONFIGURATION UPDATE ACKNOWLEDGE.

For the information transmitted from the eNB to the MME in embodiments of the present application, it can be over at least one of the messages: eNB CONFIGURATION UPDATE, eNB CONFIGURATION TRANSFER, eNB DIRECT INFORMATION TRANSFER, and MME CONFIGURATION UPDATE ACKNOWLEDGE.

For the information transmitted or received in embodiments of the present application on eNB level or at eNB side can also be the information on cell level. It is commonly understood by the specification.

Persons skilled in the art should understand that as the technology develops and advances, the terminologies described in the present application may change, and should not affect or limit the principle and spirit of the present application.

The method according to embodiments of this application can be implemented on a programmed processor. However, the controllers, flowcharts, and modules may also be implemented on a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which there resides a finite state machine capable of implementing the flowcharts shown in the figures may be used to implement the processor functions of this application.

While this application has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be capable of making and using the teachings of the present application by simply employing the elements of the independent claims. Accordingly, the embodiments of the present application as set forth herein are intended to be illustrative, not limiting. Various changes may be made without departing from the spirit and scope of the present application.

In this document, relational terms such as "first," "second," and the like may be used solely to distinguish one entity or action from another entity or action without necessarily requiring or implying any actual such relationship or order between such entities or actions. The terms "includes," "including," or any other variation thereof, are intended to cover a non-exclusive inclusion, such that a process, method, article, or apparatus that includes a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that includes the element. Also, the term "another" is defined as at least a second or more. The terms "including," "having," and the like, as used herein, are defined as "comprising."

What is claimed:

1. A method performed by a base station (BS), the method comprising:
   determining grouping rule information on a set of user equipment (UE) grouping rules for wake up signal (WUS) supported in the BS, the grouping rule information determined based at least in part on at least one paging probability information zone and a percentage of UEs in each of the at least one paging probability information zone; and
   configuring WUS resource information and group information associated with the set of grouping rules.

2. The method according to claim 1, wherein the grouping rule information comprises at least one of a UE-ID-based grouping rule, a paging-probability-information-based grouping rule, and a combination of the UE-ID-based grouping rule with the paging-probability-information-based grouping rule.

3. The method according to claim 1, wherein the group information associated with the set of grouping rules is configured in an implicit or explicit way, and is at least one of the following:
   group number information on a UE-ID-based grouping rule;
   group number information on a paging-probability-information-based grouping rule; and
   group number information on a combination of grouping rules at least including the UE-ID-based grouping rule and the paging-probability-information-based grouping rule.

4. The method according to claim 1, further comprising:
   receiving UE distribution information associated with information on paging probability of UEs; and
   determining the grouping rule information on the set of grouping rules for WUS supported in the BS based on the received UE distribution information.

5. The method according to claim 4, wherein the UE distribution information indicates:
   the at least one paging probability information zone and a number of UEs in each of the at least one paging probability information zone;
   the at least one paging probability information zone and the percent of UEs in each of the at least one paging probability information zone;
   a total number of UEs in all of the at least one paging probability information zone, or a number of UEs in one of the at least one paging probability information zone;
   or some combination thereof.

6. The method according to claim 5, wherein each of the at least one paging probability information zone is a paging probability zone indicating a paging probability range or a paging probability group zone indicating a range of paging probability groups.

7. The method of claim 1, further comprising transmitting at least one suggested paging probability information zone.

8. The method according to claim 1, further comprising transmitting group information for WUS supported in the BS, wherein the group information for WUS supported in the BS comprises a number of UE groups for WUS supported in the BS, wherein the WUS is associated with one or more paging occasions (POs).

9. The method according to claim 1, further comprising receiving suggested group information for WUS supported in the BS, wherein:
   the suggested group information for WUS supported in the BS comprises a suggested number of UE groups supported in the BS per WUS resource, a suggested number of UE groups per gap type, or a suggested number of UE groups per WUS resource and per gap type;

the suggested group information for WUS supported in the BS comprises the WUS resource information;
or a combination thereof.

10. The method according to claim 1, comprising:
receiving paging probability group information, and information of paging probability zone of the paging probability group information;
determining a paging-probability-information-based group of a UE;
receiving default group information, wherein the default group is a group with lowest paging probability information, highest paging probability information, or dedicated paging probability information;
or some combination thereof.

11. An apparatus comprising:
at least one memory; and
at least one processor coupled with the at least one memory and configured to cause the apparatus to:
determine information on paging probabilities of user equipments (UEs) for wake up signal (WUS), the information comprising at least one paging probability information zone and a percentage of UEs in each of the at least one paging probability information zone; and
transmit the information on paging probabilities of UEs for WUS.

12. The apparatus according to claim 11, wherein the at least one processor is further configured to cause the apparatus to transmit UE distribution information associated with the paging probabilities of UEs.

13. The apparatus according to claim 12, wherein the UE distribution information indicates:
the at least one paging probability information zone and a number of UEs in each of the at least one paging probability information zone;
the at least one paging probability information zone and the percent of UEs in each of the at least one paging probability information zone;
a total number of UEs in all of the at least one paging probability information zone, or a number of UEs in one of the at least one paging probability information zone;
or some combination thereof.

14. The apparatus according to claim 13, wherein each of the at least one paging probability information zone is a paging probability zone indicating a paging probability range or a paging probability group zone indicating a range of paging probability groups.

15. A user equipment (UE), comprising:
at least one memory; and
at least one processor coupled with the at least one memory and configured to cause the UE to:
receive grouping rule information on a set of (user equipment) UE grouping rules for wake up signal (WUS) supported in a base station (BS), the grouping rule information based at least in part on at least one paging probability information zone and a percentage of UEs in each of the at least one paging probability information zone;
receive WUS resource information and group information associated with the set of grouping rules; and
determine a grouping rule of the UE for WUS based on capability information on grouping rule of the UE for WUS and the grouping rule information supported in the BS.

16. The UE according to claim 15, further wherein the at least one processor is further configured to cause the UE to:
report the capability information on grouping rule to a mobility management entity (MME) associated with the UE.

17. The UE according to claim 15, wherein:
the capability information on grouping rule comprises information on priority of grouping rule in the UE;
the at least one processor is further configured to cause the UE to receive configuration information for confirming the priority of grouping rule or changing the priority of grouping rule;
the at least one processor is further configured to determine the grouping rule of the UE for WUS based on the information on priority of grouping rule configured by the UE or a mobility management entity (MME) associated with the UE;
the at least one processor is further configured to determine the grouping rule of the UE for WUS based on the information on priority of grouping rule;
the at least one processor is configured to determine the grouping rule of the UE for WUS as a grouping rule with the highest priority in the set of grouping rules in the UE and being supported in the BS;
the information of priority of grouping rules is configured by the UE or a mobility management entity (MME) associated with the UE, or is predefined;
or some combination thereof.

18. The UE according to claim 17, wherein the priority of grouping rules in the UE is one of the following:
priority of a combination of a UE-ID-based grouping rule and a paging-probability-information-based grouping rule is higher than that of the paging-probability-information-based grouping rule, and priority of the paging-probability-information-based grouping rule is higher than that of the UE-ID-based grouping rule;
priority of the paging-probability-information-based grouping rule is higher than that of the UE-ID-based grouping rule;
priority of the UE-ID based grouping rule is higher than that of a combination of UE-ID-based grouping rule and paging-probability-information-based grouping rule; priority of a combination of UE-ID-based grouping rule and paging-probability-information-based grouping rule is higher than that of the paging-probability-information-based grouping rule;
priority of the UE-ID-based grouping rule is higher than that of the paging-probability-information-based grouping rule; and
priority of the UE-ID-based grouping rule is the lowest.

19. The UE according to claim 15, wherein the capability information on grouping rules indicates that all grouping rules for WUS are mandatory or supported for the UE.

20. The UE according to claim 15, wherein:
in response to the capability information on grouping rules not supporting any grouping rule indicated in the grouping rule information, the at least one processor is further configured to cause the UE to monitor the WUS based on a UE-ID-based grouping rule or based on a WUS scheme;
the at least one processor is further configured to cause the UE to receive a grouping rule in a paging message, wherein the grouping rule includes: a UE-ID-based grouping rule, a paging-probability-information-based grouping rule, or a combination of the UE-ID-based grouping rule and paging-probability-information-based grouping rule;
or a combination thereof.

* * * * *